United States Patent [19]

Vermeulen

[11] 4,229,037

[45] Oct. 21, 1980

[54] VEHICLE, PROVIDED WITH A SLIDING ROOF ASSEMBLY

[75] Inventor: Theodorus H. Vermeulen, Heemstede, Netherlands

[73] Assignee: Vermeulen-Hollandia Octrooien B.V., Haarlem, Netherlands

[21] Appl. No.: 18,792

[22] Filed: Mar. 8, 1979

[30] Foreign Application Priority Data

Dec. 15, 1978 [NL] Netherlands .......................... 7812198

[51] Int. Cl.$^3$ ............................................. B62D 25/06
[52] U.S. Cl. ..................................... 296/216; 296/222
[58] Field of Search ..................................... 296/137 E

[56] References Cited

U.S. PATENT DOCUMENTS

| | | | |
|---|---|---|---|
| 3,016,263 | 1/1962 | Rehmann | 296/137 E |
| 3,078,122 | 2/1963 | Werner | 296/137 E |
| 3,993,348 | 11/1976 | Pizzuti | 296/137 E |

FOREIGN PATENT DOCUMENTS 2543734  4/1977  Fed. Rep. of Germany ....... 296/137 E Primary Examiner—Robert R. Song

[57] ABSTRACT

A vehicle, in particular a motor-car, provided with a sliding roof assembly. This sliding roof assembly comprises a sliding panel which is mounted in a frame so as to be movable forward and backward, and which closes a ventilating opening in its forward position and releases this ventilating opening in its opened position, while a roof plate, fastened on the frame, forms a covered portion behind this ventilating opening underneath which the sliding panel extends at least partly when in its opened position. The assembly consisting of the frame, the sliding panel and the roof plate is inserted from above into a substantially rectangular opening in the vehicle roof and is connected on the vehicle roof by means of a peripheral supporting rim of this assembly. The upper side of this assembly is provided with a cover. The supporting rim of the assembly is at least substantially flat in the direction perpendicular to the adjacent edge of the opening in the vehicle roof. The cover of the assembly extends beyond the outer circumference of the peripheral supporting rim onto the roof of the vehicle.

12 Claims, 8 Drawing Figures

VEHICLE, PROVIDED WITH A SLIDING ROOF ASSEMBLY

BACKGROUND OF THE INVENTION

The invention relates to a vehicle, in particular a motor-car, provided with a sliding roof assembly comprising a sliding panel which is mounted in a frame so as to be movable forward and backward, and which closes a ventilating opening in its forward position and releases this ventilating opening in its opened position, while a roof plate, fastened on the frame, forms a covered portion behind this ventilating opening underneath which the sliding panel extends at least partly when in its opened position, whereby the assembly consisting of the frame, the sliding panel and the roof plate is inserted from above into a substantially rectangular opening in the vehicle roof and is connected on the vehicle roof by means of a peripheral supporting rim of this assembly, while the upper side of this assembly is provided with a cover.

In a known embodiment of such a sliding roof assembly, the upper surface of this assembly in the mounted state protrudes for some distance, generally a distance of about 1 cm, above the vehicle roof that surrounds the assembly. This is caused by the fact that the peripheral supporting rim of the assembly is slightly cambered in the direction parallel to the adjacent edge of the opening in the vehicle roof, corresponding to the shape of the underlying roof portion of the vehicle, but is bent in the direction perpendicular to this edge of the opening according to a considerably smaller radius of curvature than that of the underlying roof portion of the vehicle, the space between this peripheral supporting rim and the vehicle roof being filled with a filler element that is capable of deformation under pressure.

Although this known sliding roof assembly operates excellently in practice, the stepwise difference in height between the assembly and the vehicle roof which surrounds the assembly may be considered a drawback both from an aesthetic and from an aerodynamic point of view.

SUMMARY OF THE INVENTION

It is an object of the present invention to provide a vehicle with a sliding roof assembly, wherein this drawback is effectively removed.

To this end, the peripheral supporting rim of the assembly is at least substantially flat in the direction perpendicular to the adjacent edge of the opening in the vehicle roof, the cover of the assembly extending beyond the outer circumference of the peripheral supporting rim onto the roof of the vehicle.

This flat shape of the peripheral supporting rim of the assembly allows this rim to be mounted with a very small difference in height with respect to the vehicle roof which surrounds the rim.

Since the cover of the assembly also continues on the vehicle roof, the possibility is obtained of effectively eliminating this slight difference in height, or at least to reduce the same to an aesthetically and aerodynamically acceptable minimum.

The peripheral supporting rim of the assembly may rest over its entire extent upon the vehicle roof.

In this embodiment, the difference in height between the peripheral supporting rim and the vehicle roof which surrounds this rim has been reduced to a minimum.

As an alternative the peripheral supporting rim of the assembly may rest upon the vehicle roof through the intermediate of one or more interposed filler strips.

In that case, it is preferred that the filler strip or strips is (are) rigidly fixed to the peripheral supporting rim of the assembly.

This embodiment is of special importance, when a portion of the peripheral supporting rim of the assembly is downwardly offset and is connected to overlying edge portions of the roof plate, while the filler strip or strips is (are) fitted underneath the remaining portion of this rim.

The peripheral supporting rim of the assembly thus shows step-like parts at the places where the edge portions of the roof plate begin, in such a way that this rim, together with the underlying filler strip or strips and the overlying edge portions of the roof plate, forms a flange of at least substantially constant thickness along the entire circumference.

The cover may be applied on the entire vehicle roof, in which case it is preferable for this cover to be composed of three parts which are stitched together, a longitudinal stitched seam extending directly adjacent to each of the two lateral parts of the peripheral supporting rim of the assembly.

According to a favourable embodiment of the invention, packing material is fitted underneath the cover in front of the forward part of the peripheral supporting rim of the assembly and behind the rear part of this rim, said packing material extending up to these parts of the rim.

The cover may be made of vinyl foil, while foam plastic with a closed cell structure may be used for the packing material.

The peripheral supporting rim of the assembly may be fixed to the vehicle roof with the use of pop rivets.

BRIEF DESCRIPTION OF THE DRAWINGS

The invention will be explained hereinafter with reference to the drawing.

DESCRIPTION OF A PREFERRED EMBODIMENT

Figure 1:
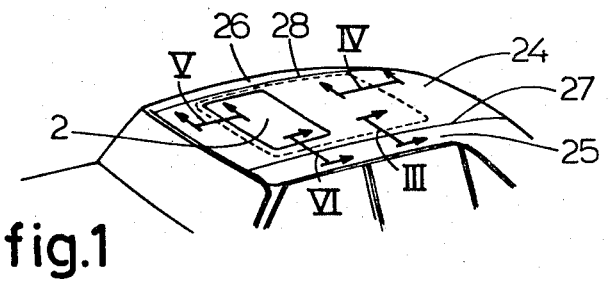
FIG. 1 is a perspective view of a vehicle roof provided with a sliding roof assembly according to the invention.

FIG. 1 illustrates an embodiment of a motor-car provided with a sliding roof assembly according to the invention, shown in the closed position.

Figure 2:
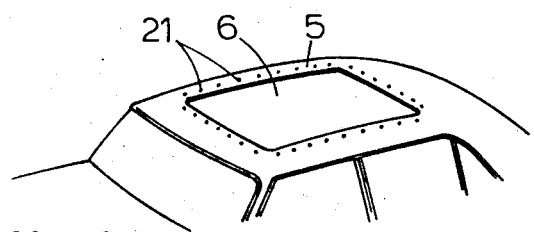
FIG. 2 is a perspective view of the vehicle roof according to FIG. 1, before the sliding roof assembly has been mounted.

In the embodiment according to FIGS. 3–7 this sliding roof assembly comprises a frame 1, a sliding panel 2 which is slidably mounted in this frame 1 so as to be movable forward and backward, a roof plate 3 which is fastened on the frame 1, and three flat filler strips 4 arranged in U-shape. This assembly has to be mounted in an opening 6 which has been formed in the vehicle roof 5 (FIG. 2).

The frame 1, preferably pressed in one piece from sheet metal, has the shape of a trough and comprises a lower wall 7, wherein an opening 8 is formed near the front side. The lower wall 7 comprises a wall portion 9 at the rear of this opening 8. This wall portion 9 is provided with stiffening ribs 10. The lower wall 7 of the frame 1 is surrounded by upright wall portions 11, which adjoin at their upper end to an outwardly protruding supporting rim 12, which extends along the entire periphery of the frame 1.

In the embodiment according to FIGS. 3–7 the roof plate 3 has an approximately rectangular circumference and is secured at its rear edge portion 13 and at its lateral edge portions 14 to the peripheral supporting rim 12 of the frame 1, for instance by spot welding. This rim 12 of the frame 1 has a U-shaped, downwardly offset rear portion 15, in which this rear edge portion 13 and the lateral edge portions 14 of the roof plate 3 are received.

The front edge 16 of the roof plate 3 together with the front part of this rim 12 of the frame 1 encloses an opening 17. The openings 8 and 17 are closed by the sliding panel 2 in its forward or closed position. When the sliding panel 2 is moved back from this closed position, and is guided by guides 18 which are fixed to the frame 1, the upper plate 19 of this sliding panel 2 is first lowered in a known manner at its rear end so as to allow it to pass underneath the roof plate 3. In its open position, the sliding panel 2 is accommodated at least in part in the space between this roof plate 3 and the wall portion 9 of the lower wall 7 of the frame 1.

Underneath the front part of the peripheral supporting rim 12 of the frame 1, which is clear of the roof plate 3, three filler strips 4, arranged in U-shape, are rigidly secured, for instance by means of spot welding. The downwardly offset rear portion 15 of the supporting rim 12, which accommodates the edge portions 13, 14 of the roof plate 3, ends at the rear ends of the lateral filler strips 4. This causes the supporting rim 12 of the frame 1, together with the edge portions 13, 14 of the roof plate 3 and the filler strips 4, to form a flange of constant thickness along the entire periphery, as shown in the detail drawing belonging to FIG. 7.

The peripheral supporting rim 12 of the frame 1, which is slightly cambered in the direction parallel to the adjacent edge of the opening 6 in the vehicle roof 5, corresponding to the shape of the underlying roof portion of the vehicle, is flat in the direction perpendicular to this edge of the opening. The downwardly offset portion 15 of this rim 12, which bears the edge portions 13, 14 of the roof plate 3, rests directly upon the vehicle roof 5, while the filler strips 4, which are secured underneath the front portion of the rim 12 also rest directly upon the roof 5 of the vehicle.

If desired, it is possible to provide a plastic sealing material between the peripheral supporting rim 12 of the frame 1 and the vehicle roof 5 as well as between the filler strips 4 and the vehicle roof 5, but this is not generally required.

The assembly, consisting of the frame 1, the sliding panel 2 and the roof plate 3, is prefabricated at the factory, where the three filler strips 4 are also secured underneath the front part of the peripheral supporting rim 12 of the frame 1. This assembly is lowered through the opening 6 into the vehicle roof 5, until the filler strips 4 and the adjacent rear portion of the peripheral supporting rim 12 of the frame 1 come to rest upon the vehicle roof 5. The supporting rim 12, with the overlying edge portions 13, 14 of the roof plate 3 and with the filler strips 4, is then fastened to the vehicle roof 5 by means of pop rivets 20. As shown in FIG. 2, holes 21 for the pop rivets 20 have been provided in advance in the vehicle roof 5. This also applies to the peripheral supporting rim 12 of the frame 1, the edge portions 13, 14 of the roof plate 3, and the filler strips 4. Mounted along the entire circumference of the opening 6 in the vehicle roof 5 is furthermore a stiffening section 22, the web of which rests against the lower surface of the vehicle roof 5 and likewise has holes 21 for the pop rivets 20. This stiffening section 22 is preferably frame-shaped.

The sliding panel 2 is provided on its upper side with a cover 23, which is preferably fabricated from vinyl foil. The frame 1 and the roof plate 3 are likewise provided on their upper side with a foil 24, which extends beyond the outer circumference of the peripheral supporting rim 12 of the frame 1 and continues on the vehicle roof 5.

It will generally be preferable to provide the entire vehicle roof 5 with a cover of vinyl foil. In the example shown, this cover is composed of an intermediate portion constituted by the foil 24 of the frame 1 and of the roof plate 3, which continues forward and rearward of the supporting rim 12 on the vehicle roof 5, and of two foils 25 and 26 on both sides thereof.

Figure 3:
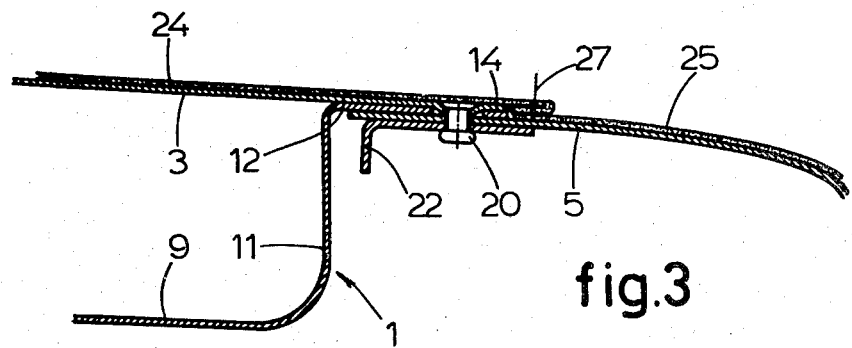
FIGS. 3, 4, 5 and 6 are sections along the lines III—III, IV—IV, V—V, and VI—VI in FIG. 1 on a larger scale.
Figure 4:
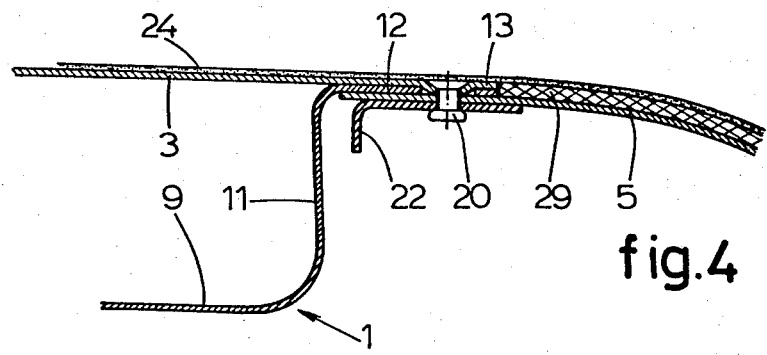
Figure 5:
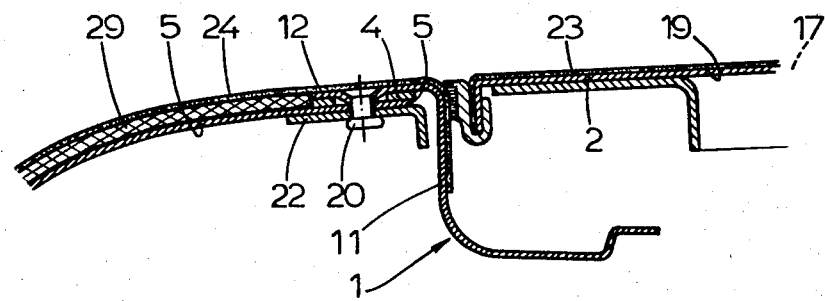
Figure 6:
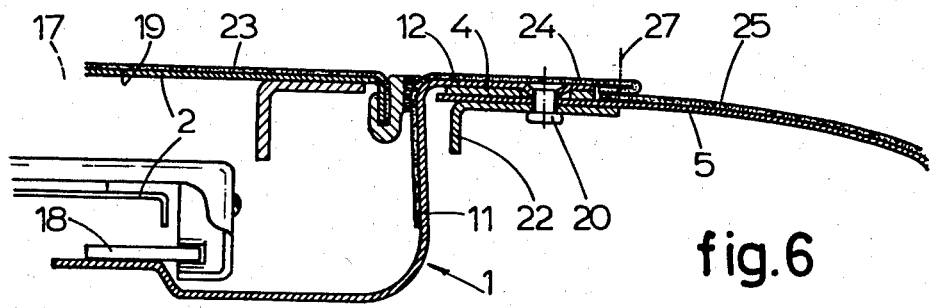
Figure 7:
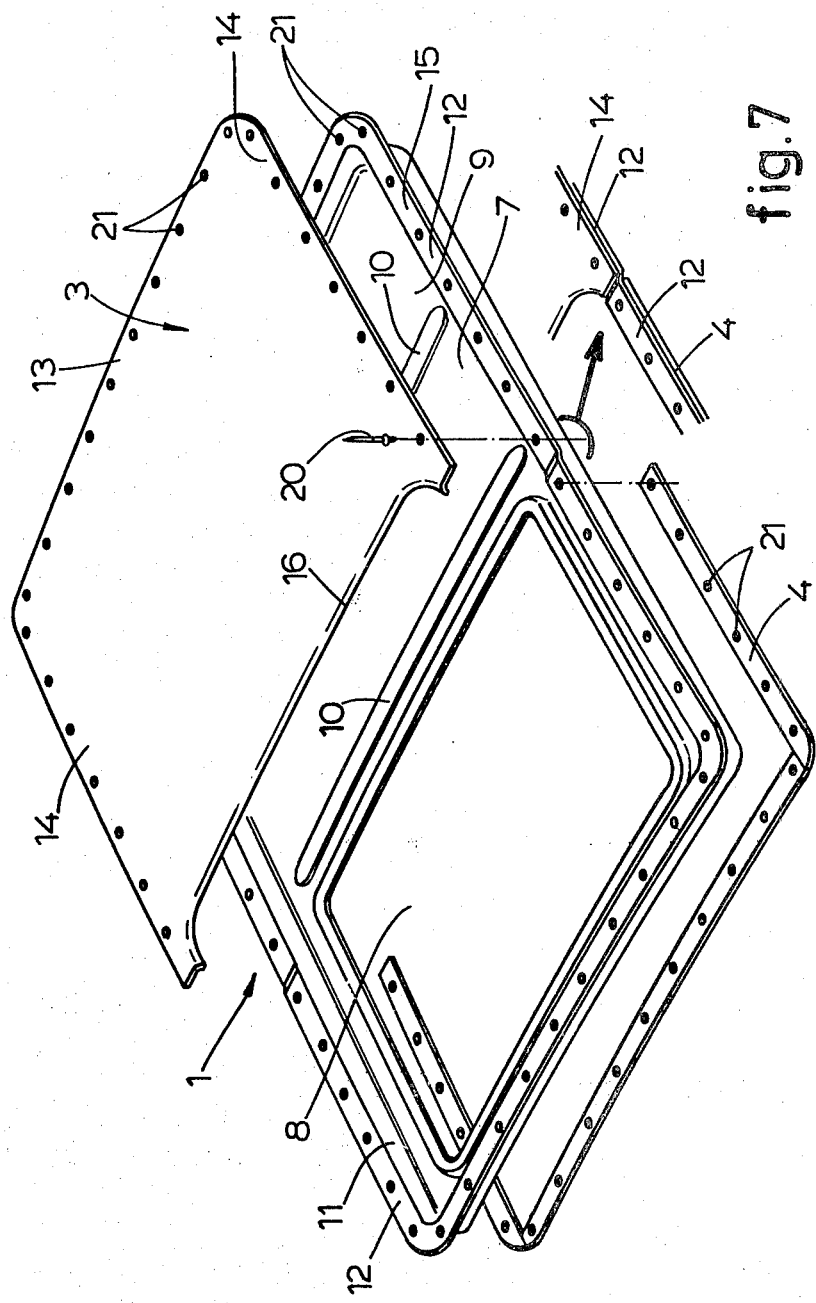
FIG. 7 is a perspective view of the frame according to FIGS. 3–6, with detached roof plate and filler strips.

As shown in FIGS. 3 and 6, the foil 24 of the frame 1 and of the roof plate 3 is folded back just beyond the lateral parts of the peripheral supporting rim 12. These folded back edge portions rest upon the foils 25 and 26 respectively, which are mounted on the vehicle roof 5 and to which the foil 24 is fixed by seams 27 and 28, respectively, which extend lengthwise, directly adjacent to each of the lateral parts of the supporting rim 12.

Packing material 29, preferably foam plastic with a closed cell structure, is fitted underneath the foil 24 in front of the forward part of the peripheral supporting rim 12 of the frame 1 and behind the rear part of this rim 12. This packing material 29 extends up to the rim 12 of the frame 1, as a result of which the foil 24 proceeds without difference in height along the vehicle roof 5, the frame 1 and the roof plate 3.

The foils 25 and 26 may extend laterally to the gutters above the car doors. In the area of the front edge and the lateral edges of the opening 17, the foil 24 is furthermore fastened on the upright wall portions 11 of the frame 1.

Figure 8:
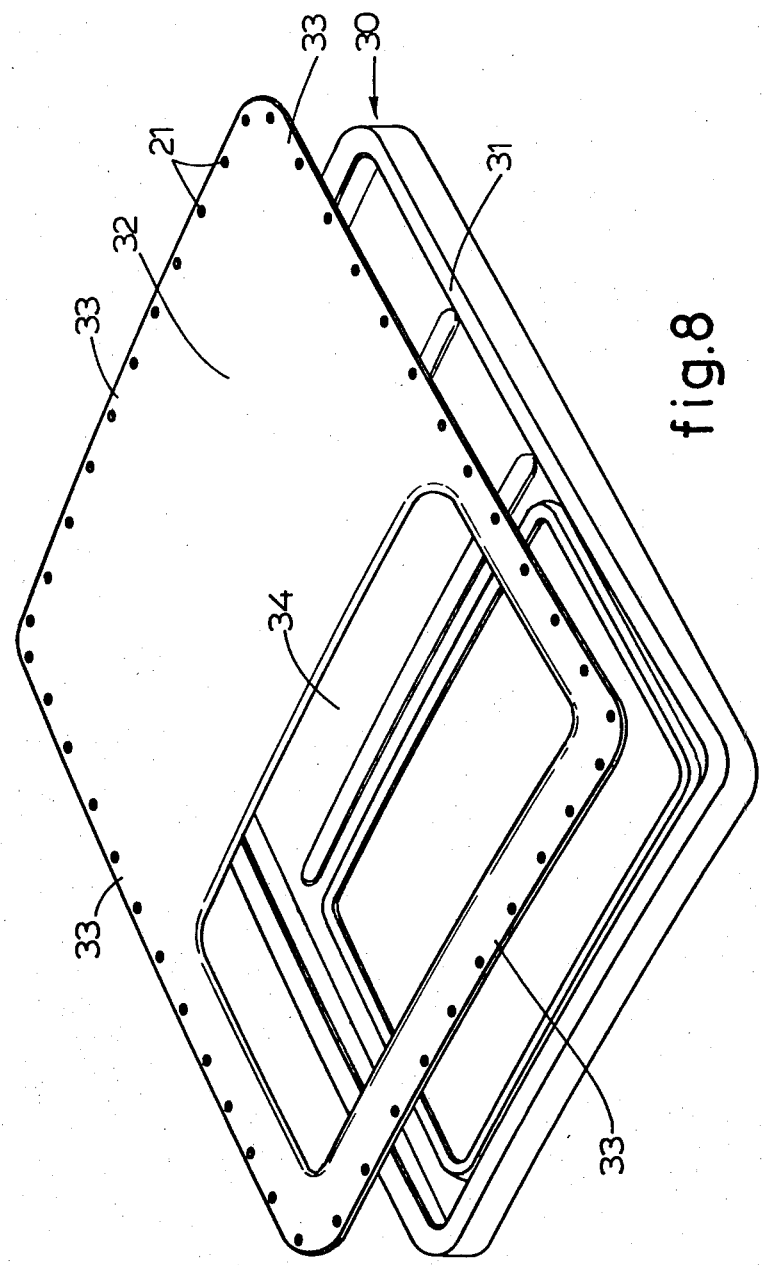
FIG. 8 is a perspective view, corresponding to FIG. 7, of a modified embodiment of the frame, with detached roof plate.

According to the modified embodiment of the sliding roof assembly shown in FIG. 8, the frame 30 has an upper, inwardly directed circumferential top flange 31. The roof plate 32 has a peripheral rim 33, which protrudes along the whole circumference beyond the frame 30 and which thus functions as the supporting rim. In the roof plate 32, an opening 34 has been formed which may be closed by means of the sliding panel 2. The roof plate 32 may be fixed to the frame 30 by spot welding, while its front edge portion and its lateral edge portions adjacent the opening 34 can be swaged around the top flange 31 of the frame 1. The peripheral supporting rim 33 of the roof plate 32 is again at least substantially flat in the direction perpendicular to the adjacent edge of the opening 6 in the vehicle roof 5.

The peripheral supporting rim 33 of the roof plate 32 rests in its entirety upon the vehicle roof 5, so that the use of filler strips is unnecessary. Holes 21 for pop rivets have again been formed in this peripheral supporting rim 33.

According to the invention, a sliding roof assembly for a vehicle is provided, in which there is only a very slight difference in height between the upper side of the sliding roof assembly and the vehicle roof 5, and in which this minor difference is effectively eliminated by the cover 24, 25, 26 made of vinyl foil or similar material.

The invention is not restricted to the examples shown in the drawing, which may be varied in several ways within the scope of the appended claims.

I claim:

1. A vehicle, in particular a motor-car, provided with a sliding roof assembly comprising a sliding panel which is mounted in a frame so as to be movable forward and backward, and which closes a ventilating opening in its forward position and releases this ventilating opening in its opened position, while a roof plate, fastened on the frame, forms a covered portion behind this ventilating opening underneath which the sliding panel extends at least partly when in its opened position, whereby the assembly consisting of the frame, the sliding panel and the roof plate is inserted from above into a substantially rectangular opening in the vehicle roof and is connected on the vehicle roof by means of a peripheral supporting rim of this assembly, while the upper side of this assembly is provided with a cover, and the supporting rim of the assembly is at least substantially flat in the direction perpendicular to the adjacent edge of the opening in the vehicle roof, the cover of the assembly extending beyond the outer circumference of the peripheral supporting rim onto the roof of the vehicle.

2. A vehicle according to claim 1, wherein the peripheral supporting rim of the assembly rests over its entire extent upon the vehicle roof.

3. A vehicle according to claim 1, wherein at least a portion of the peripheral supporting rim of the assembly rests upon the vehicle roof through the intermediate of one or more interposed filler strips.

4. A vehicle according to claim 3, wherein the filler strip or strips is (are) rigidly fixed to the peripheral supporting rim of the assembly.

5. A vehicle according to claim 4, wherein a portion of the peripheral supporting rim of the assembly is downwardly offset and is connected to overlying edge portions of the roof plate, while the filler strip or strips is (are) fitted underneath the remaining portion of this rim.

6. A vehicle according to claim 1, wherein the cover is applied on the entire vehicle roof.

7. A vehicle according to claim 6, wherein the cover is composed of three parts which are stitched together, a longitudinal seam extending directly adjacent to each of the two lateral parts of the peripheral supporting rim of the assembly.

8. A vehicle according to claim 7, wherein packing material is fitted underneath the cover in front of the forward part of the peripheral supporting rim of the assembly and behind the rear part of this rim, said packing material extending up to said parts of the rim.

9. A vehicle according to claim 8, wherein the cover is made of vinyl foil.

10. A vehicle according to claim 8, wherein foam plastic with a closed cell structure is used for the packing material.

11. A vehicle according to claim 1, wherein the peripheral supporting rim of the assembly is fixed to the vehicle roof by means of pop rivets.

12. A sliding roof assembly for a vehicle according to claim 1.

* * * * *